United States Patent [19]

Bausman et al.

[11] Patent Number: 5,442,475

[45] Date of Patent: Aug. 15, 1995

[54] OPTICAL CLOCK DISTRIBUTION METHOD AND APPARATUS

[75] Inventors: Marvin D. Bausman; Steven S. Chen, both of Chippewa Falls; Edward C. Priest, Eau Claire; Douglas C. Paffel, Stanley, all of Wis.

[73] Assignee: Cray Research, Inc., Fagan, Minn.

[21] Appl. No.: 231,996

[22] Filed: Apr. 21, 1994
(Under 37 CFR 1.47)

Related U.S. Application Data

[63] Continuation of Ser. No. 807,100, Jul. 15, 1991, abandoned.

[51] Int. Cl.[6] .................. H04J 14/08; H04B 10/00
[52] U.S. Cl. .................................. 359/140; 359/158; 359/162; 359/163; 375/356; 385/24; 395/550; 327/292; 327/295
[58] Field of Search ............... 359/154, 158, 163, 167, 359/173, 140, 162; 375/107; 395/550; 385/29; 307/219, 269

[56] References Cited

U.S. PATENT DOCUMENTS

| | | | |
|---|---|---|---|
| 4,422,088 | 12/1983 | Gfeller . | |
| 4,755,704 | 7/1988 | Flora et al. . | |
| 4,831,662 | 5/1989 | Kuhn . | |
| 4,905,218 | 2/1990 | Takeuchi et al. | 359/132 |
| 4,943,136 | 7/1990 | Popoff . | |
| 4,959,540 | 9/1990 | Fan et al. | 250/227.12 |
| 5,065,454 | 11/1991 | Bien et al. | 359/158 |
| 5,122,679 | 6/1992 | Ishii et al. | 307/269 |

OTHER PUBLICATIONS

"Final Report: Optical Clock Distribution System" Contract Number MDA 904-82-C-0422, presented to Maryland Procurement Office, Fort George G. Meade, Md., prepared by Davis H. Hartman, published by Motorola, Inc., Government Electronics Group.

"Basics of PIN and Photoconductor Detectors" published by Motorola, Inc.

Series of Overheads published by Motorola, Inc., Semiconductor Sector, Bipolar Technology Center.

*IEEE Design & Test of Computers,* vol. 5, No. 5, Oct. 1988, IEEE, (New York, U.S.), K. D. Wagner: "Clock System Design", pp. 9–27.

*IEEE Journal of Solid-State Circuits,* vol. SC–21, No. 2, Apr. 1986, IEEE (New York, U.S. E. G. Friedman et al.: "Design and Analysis of a Hierarchical Clock Distribution System for Synchronous Standard Cell/Macrocell VLSI", pp. 240–246.

*IBM Technical Disclosure Bulletin,* vol. 26, No. 4, Sep. 1983, IBM Corp., J. T. Brady, "Low Skew Fiber-Optic Clock Distribution System", p. 2143.

*Optical Engineering,* vol. 25, No. 10, Oct. 1986, Bell Communications Research, Davis H. Hartman, "Digital High Speed Interconnects: A Study of the Optical Alternative", pp. 1086–1102.

*Journal of Lightwave Technology,* vol. 1t–4, No. 1, Jan. 1986, IEEE, Davis H. Hartman et al., "An Effective Lateral Fiber-Optic Electronic Coupling and Packaging Technique Suitable for VHSIC Applications", pp. 73–82.

*Journal of Lightwave Technology,* vol. 1t–3, No. 4, Aug. 1985, IEEE, Davis H. Hartman et al., "A Monolithic Silicon Photodetect/Amplifier IC for Fiber and Integrated Optics Application", pp. 729–738.

*Computers and Signal Processing,* Jun. 4–5, 1987, IEEE, David Dodds et al., "Point to Point Clocking for FDDI Fiber Optic Data Rings", pp. 323–326.

*Electronics Letters,* Jun. 4, 1987, P. R. Prucnal et al., "Fibre-Optic Network Using All-Optical Processing", pp. 629–630.

(List continued on next page.)

Primary Examiner—Richard E. Chilcot, Jr.
Assistant Examiner—Rafael Bacares
Attorney, Agent, or Firm—Schwegman, Lundberg & Woessner

[57] ABSTRACT

An optical clock distribution method and apparatus is disclosed that minimizes clock skew in the distribution of clock signals to logic assemblies in a computer system. The logic assemblies convert the optical signals into equivalent electrical signals.

9 Claims, 3 Drawing Sheets

OTHER PUBLICATIONS

*Optical Engineering*, vol. 25, No. 10, Oct. 1986, Bradley D. Clymer et al., "Optical Clock Distribution to Silicon Chips", pp. 1103–1108.

*Optical Engineering*, vol. 25, No. 10, Oct. 1986, D. Z. Tsang et al., "A Technology for Optical Interconnections Based on Multichip Integration", pp. 1127–1131.

*IEEE Spectrum*, Mar. 1987, Lynn D. Hutcheson et al., "Optical Interconnects Replace Hardwire", pp. 30–35.

*Optical Engineering*, vol. 25, No. 10, Oct. 1986, P. R. Haugen et al., "Optical Interconnects for High Speed Computing", pp. 1076–1085.

*Proceedings of the IEEE*, vol. 72, No. 7, Jul. 1984, Joseph W. Goodman et al., "Optical Interconnections for VLSI Systems", pp. 850–866.

*Electronics and Photonics Laboratory*, Feb. 27, 1987, GTE Laboratories Incorporated, "High Speed Optoelectronic Data Link Phase O Study", pp. 1–156.

*Optical Interconnect Applications and Receiver Design Concepts*, Sep. 1986, Bell Communications Research.

OPTICAL CLOCK DISTRIBUTION METHOD AND APPARATUS

This is a continuation of application Ser. No. 07/807,100, filed Jul. 15, 1991, now abandoned.

BACKGROUND OF THE INVENTION

1. Field of the Invention

This invention relates generally to methods of distributing clock signals in computer systems. In particular, the present invention provides a method and apparatus for distributing an optical clock signal in computer systems.

2. Background Information

In computer systems, a system clock signal is distributed throughout as a reference signal to control the timing of events. The use of a reference clock simplifies the design of data transfer structures within the computer since they can be designed to operate synchronous to the system clock. Synchronous designs are easier to conceptualize and to partition.

System clock signals are typically distributed from a single source point to various destination points within the computer system, which may be located some distance apart. In complex, high performance data processing systems such as those manufactured by Cray Research, Inc., the Assignee of the present invention, the clock frequency is high and the number of points to which the system clock is provided may be large. In prior art systems, high frequency clock signals were typically distributed as electrical signals sent point-to-point from the source to the destination. Point-to-point connections made in this manner act as individual antennae radiating radio frequency (RF) energy that adds to system noise and can significantly affect reliability.

Also, for reasons which will be discussed later, signals distributed by this means do not arrive at all destination points at exactly the same time. The difference in time between these arrivals is called skew.

Within a computer system, data is passed from register to register, with varying amounts of processing performed between registers. Registers store data present at their inputs either at a system clock transition or during a phase of the system clock. Skew in the system clock signal impacts register-to-register transfers; it may cause a register to store data either before it has become valid or after it is no longer valid.

On slower computer systems, skew is usually a small portion of the clock period. Its impact can be reduced by adding delay to the data path. However, on high performance data processing systems such as those manufactured by Cray Research, Inc., the Assignee of the present invention, the same amount of skew may be a substantial portion of the clock period and may actually limit the speed at which the computer system can operate. The amount of delay that can be added to a data path is limited. Therefore skew becomes a major design factor in the transfer of data.

Clock skew is caused by a number of factors. A typical path for a clock signal will include interconnections between circuit boards, fanout gates, circuit board foil paths, and integrated circuit (IC) interconnect metal. Each of these provides an opportunity for introducing undesired clock skew. The amount of time it takes a signal to travel along a wire, foil path, or interconnect metal is called its electrical path length and is dependent upon physical length and capacitance. All else being equal, a signal will take longer to travel a long path than a short one. If the electrical path lengths of all the clock signal paths are not equal, skew is introduced.

A second major source of skew is from the integrated circuits that drive the clock signals. In a typical system the clock signal is distributed to a limited number of clock fanout devices on a circuit board. These clock fanout devices in turn distribute the clock signal to the remaining integrated circuits on the board. There will always be differences in propagation delay between fanout devices. One reason is variation in the semiconductor manufacturing process; another is temperature and voltage differences. Propagation delay differences between fanout devices further increase clock skew. In addition, in systems where there are a large number of integrated circuits, two or more levels of fanout devices may be needed to provide a clock signal to all the registers in the system. Each level of fanout has the potential of adding additional skew to the system clock signal.

Crosstalk from adjacent signals, coupled RF interference and power and ground noise also act to increase clock skew. For example, if a signal's voltage level is altered by crosstalk, then the point in time when the signal is determined to have switched will be altered, thus introducing skew.

As system clock periods shrink there is increasing pressure on the computer architect to reduce in determinism in the system design. Clock skew, like setup and hold time and propagation delay, increase the amount of time that data is in an indeterminable state. System designers must be careful that this indeterminable state does not fall within the sampling window of a register if they are going to preserve data integrity. In prior art systems, data path delay was often used to move the location of the indeterminable state outside the sampling window. However, as clock frequencies approach 500 MHz, the ability to position the indeterminable state becomes more difficult. As a result clock skew reduces the ability to increase the system clock frequency.

Several techniques have been used to reduce clock skew. System designers attempt to equalize the wire, foil path, and interconnect metal lengths between the clock source and all destinations. This helps to reduce variation in the electrical path length due to physical length. However, since each path may have a different impedance, it is difficult to truly match electrical path length.

Methods are well known in the art for minimizing crosstalk, shielding signals and providing more stable temperature and voltage references. Likewise, variation in propagation delay between fanout devices can be controlled to a degree. This can be done by mandating stringent screening requirements or by matching components during assembly. However the former drives up the price of the devices while the latter drives up manufacturing costs. Truly matched performance is difficult to achieve because of the different loads and impedances faced by each device.

Clock distribution network tuning is a different approach at reducing the effects of clock skew. Delay is added selectively to clock paths in an attempt to equalize the delay through each of the paths. A representative tuning strategy is disclosed in the co-pending and commonly assigned patent application Ser. No. 07/465,947 filed Jan. 16, 1990 by Stephen E. Nelson et al. entitled "CLOCK DISTRIBUTION SYSTEM AND METHOD", which application is incorporated herein by reference. That application discloses the use of selectable delay paths to tune clock signal paths to compensate for clock skew.

In addition, optical clock distribution networks have been proposed as a viable alternative to electrical clock distribution. Optical fiber as a transmission medium provides numerous advantages. An optical clock distribution method provides a noise-free signal transmission environment, is resistant to electromagnetic interference, and supports high transmission rates. However, in systems proposed to date, high frequency clocks with minimal skew have been difficult to achieve.

The effectiveness and practicality of these methods varies. It is clear that there has existed a long and unfilled need in the prior art for a clock distribution method and apparatus capable of reducing clock skew. The present invention solves these and other shortcomings of the techniques known in the prior art.

SUMMARY OF THE INVENTION

To overcome the limitations in the prior art discussed above, and to overcome other limitations readily recognizable to those skilled in the art, this invention provides an optical clock distribution method and apparatus for computer systems. A high fanout coupler distributes optical clock signals of approximately the same amplitude to logic assemblies. Optical-to-electrical translation devices on each logic assembly convert the received optical clock signal to an equivalent ECL clock signal.

According to another aspect of the present invention a method is disclosed for manufacturing an optical clock distribution system to minimize clock skew.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

The preferred embodiment discloses an optical clock distribution method and apparatus for transmitting clock signals to logic assemblies using optical fibers. The logic assemblies convert the optical clock signals into the equivalent electrical clock signals.

Figure 1:
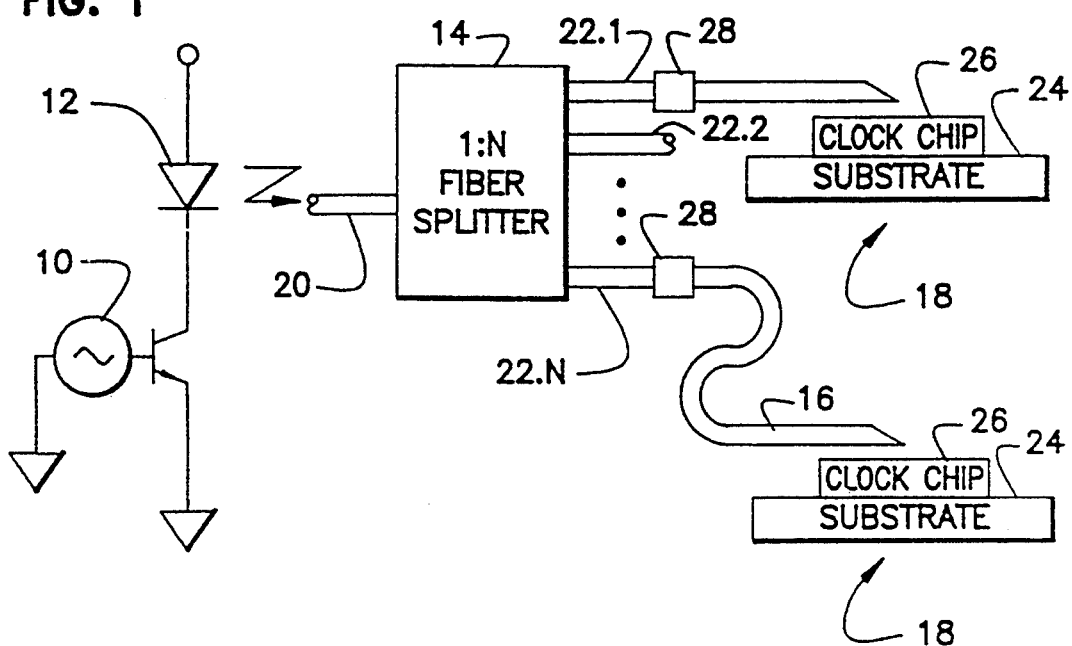
FIG. 1 illustrates the major components of the preferred embodiment.

FIG. 1 illustrates the major components of the preferred embodiment, including an oscillator 10, laser diode 12, optical coupler 14, optical fibers 16 and logic assemblies 18. Optical coupler 14 has an input fiber optic pigtail 20 for receiving the output of laser diode 12 and N output fiber optic pigtails 22.1 through 22.N for transmitting approximately 1/N of the light produced by laser diode 12 through each optical fiber 16 to its respective logic assembly 18. Logic assembly 18, in turn, comprises a substrate 24 and two clock chips 26 for converting the optical clock signal to equivalent electrical clock signals. Splice 28 connects each optical fiber 16 to an output fiber optic pigtail 22.

Oscillator 10 is connected to laser diode 12 for modulating the current driving laser diode 12, thereby producing coherent light pulses at the frequency of oscillator 10. In the preferred embodiment oscillator 10 is capable of modulating diode 12 at 500 to 1000 MHz with a 50% duty cycle. The light produced by laser diode 12 is directed as described above to each of the logic assemblies 18. Once at logic assembly 18, light from optical fiber 16 is directed to clock chip 26 where it is converted to an equivalent electrical clock signal by the lateral coupling method disclosed in an article entitled "An Effective Lateral Fiber-Optic Electronic Coupling and Packaging Technique Suitable for VHSIC Applications" published in the *Journal of Lightwave Technology*, Vol. LT-4, No. 1, January 1986. Lateral coupling is an effective method of directing the received optical signal onto the surface of a photodetector. Lateral coupling reduces the required board height by allowing optical fiber 16 to lay on the surface of clock chip 26 rather than approach perpendicularly as in prior methods. Also, this method moves the stress relief point to the board edge. In the preferred embodiment, a gold coating is applied to the beveled end of fiber 16 to enhance reflection of light down to clock chip 26.

Figure 2:
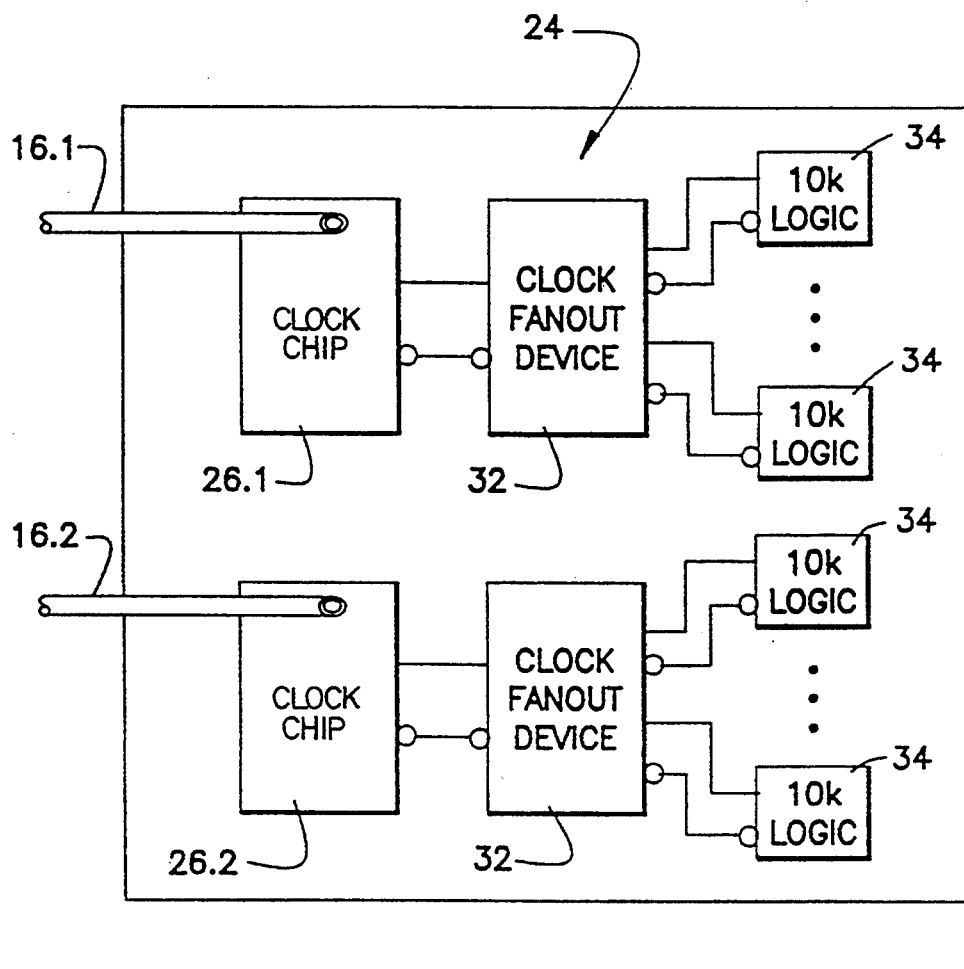
FIG. 2 illustrates the clock distribution system on a logic assembly according to the present invention.

As is illustrated in FIG. 2, in the preferred embodiment two clock chips 26.1 and 26.2 are provided on each substrate 24 to share the load of distributing the clock. Optical fibers 16.1 and 16.2 are terminated at clock chips 26.1 and 26.2, respectively. Each clock chip 26 includes a photodetector and transimpedance amplifier that are used to convert the incident optical clock signal into an equivalent ECL level differential clock signal. That signal is driven through clock fanout device 32 and then driven to integrated circuits 34 through a plurality of differential clock paths.

Figure 6:
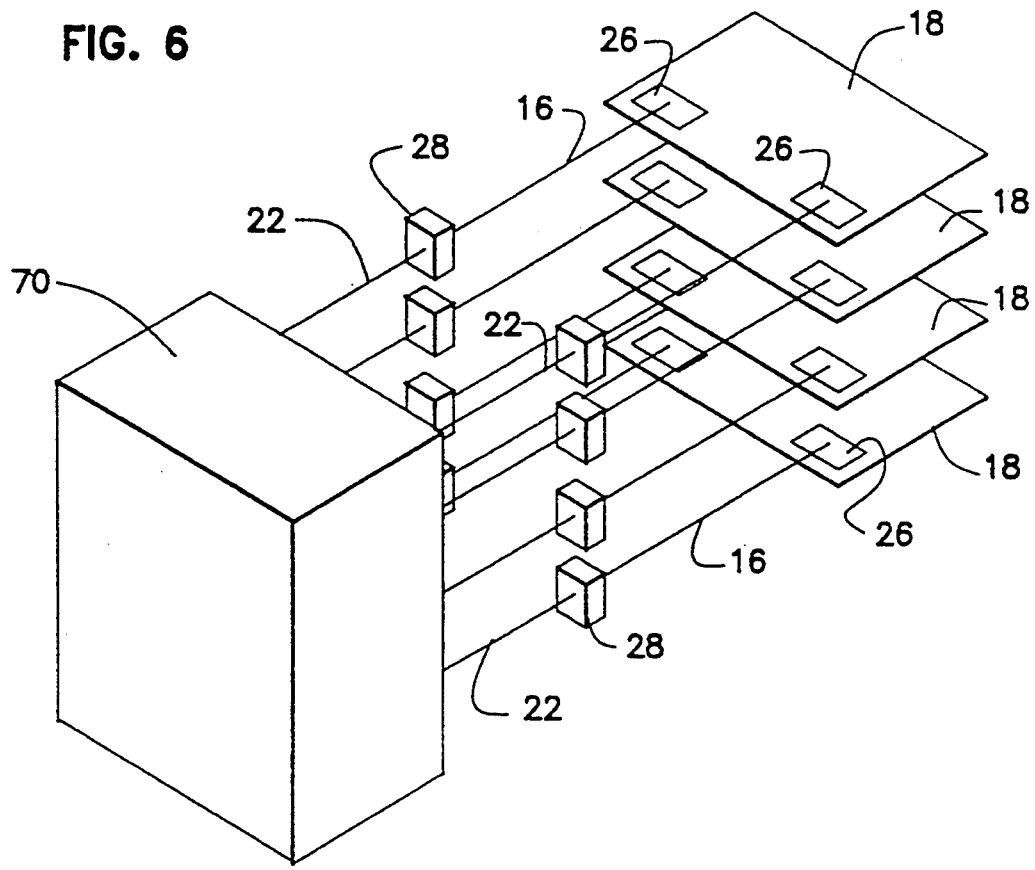
FIG. 6 illustrates an embodiment of the present invention showing the application of the present invention to multiple assemblies.

FIG. 6 illustrates a clock source 70 connected to multiple logic assemblies 18 according to the present invention. Clock source 70 includes oscillator 10, laser diode 12 and optical coupler 14 of FIG. 1. Output fiber optic pigtails 22 are connected through splices 28 to optical fibers 16. Each optical fiber 16 is connected directly to a clock chip 26 on a logic assembly 18. Clock source 70 generates and distributes a single system clock. In the preferred embodiment the system clock ranges in frequency from 500 MHz to 1 GHz with a 50 percent duty cycle.

In the preferred embodiment, optical fiber 16 is multimode optical fiber. Multimode optical fiber offers greater coupling tolerances than does a corresponding single mode fiber. Also, in the preferred embodiment fibers 16 are supported by an optical backplane, such as that disclosed in the co-pending and commonly assigned patent application Ser. No. 07/556,031 filed Jul. 20, 1990 by Melvin C. August et al. entitled "COMPUTER SIGNAL INTERCONNECT APPARATUS", which application is incorporated herein by reference. Spare output fiber optic pigtails 22 are provided at coupler 14 to facilitate field repair.

As stated previously, clock skew does not become a major design problem until the system clock frequency approaches 500 MHz. In the preferred embodiment, clock skew is restricted to less than 30 picoseconds. This permits use of a 1 GHz system clock. The optical clock system of the present invention reduces clock skew primarily by eliminating the levels of interconnect necessary to achieve fanout of 100 clock signals in an electrical clock distribution network and by reducing system noise. Optical fibers 16 do not radiate RF energy as would their electrical counterparts. The use of optical fibers permits greater control of path length from the clock source to the logic assemblies.

The design methodology of the present invention introduces further ways to reduce clock skew. For one, output pigtails 22 of optical coupler 14 are trimmed so as to present approximately equivalent optical path lengths to light from laser diode 12. Likewise, optical fibers 16 are attached to clock chips 26 as part of the chip assembly and then trimmed to ensure that the time required for light entering fiber 16 to appear as an electrical clock signal at the output of clock chip 26 is equivalent across all assemblies. This approach guarantees equivalent clock path delays no matter which output fiber optic pigtail 22 is connected to an optical fiber 16. In addition, clock fanout devices 32 contain selectable delay paths as detailed in the Nelson et al. application described above to correct for variations in propagation delay within each device 32.

Also, in the preferred embodiment, a monolithic glass coupler manufactured with an ion exchange process such as that produced by the Fiber Optic Component Division of Corning France located in Cedex, France is used to provide a relatively uniform distribution of the optical clock signal. Optical coupler 14 must be fairly uniform in its ability to split incident light into relatively equal portions. The rise and fall time of the photodetector in clock chip 26 is a function of amplitude. A large amplitude signal will pass through the threshold voltage more rapidly than a small amplitude signal. This will be reflected in the output of clock chip 26 as a large amplitude optical signal will produce an electrical signal with a longer pulse width than a corresponding lower amplitude signal. The Corning process causes changes in the index of refraction of a piece of glass. These changes create waveguides in the glass that match up very well with the optical fiber pigtails. The result is a coupler 14 that reproduces pulses produced by diode 12 uniformly and with minimal distortion.

In the preferred embodiment, coupler 14 is formed by cascading one Corning MGC 8010 Monolithic Glass Coupler with eight MGC 1610 Monolithic Glass Couplers, also from Corning. The MGC 8010 performs a one-to-eight split while the MGC 1610 performs a one-to-sixteen split. A one- to thirty-two coupler is currently available (MGC 3210 from Corning) and it is expected that as the technology matures a single integrated coupler 14 of the desired fanout will become available.

Figure 3:
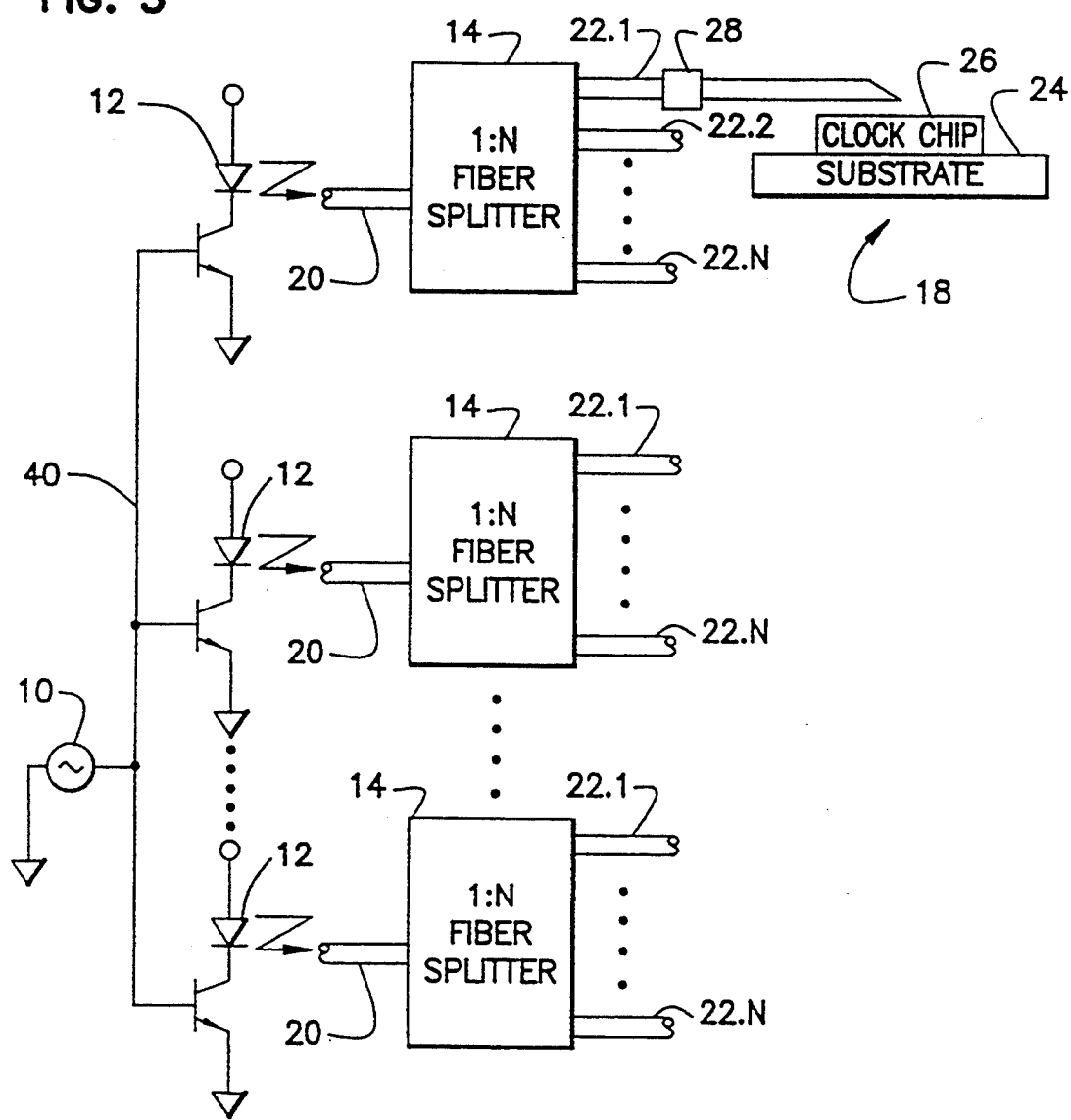
FIG. 3 shows an example of an oscillator connected to a common drive bus which powers multiple laser diodes.

Referring again to FIG. 1, the optical output from laser diode 12 is transmitted to optical coupler 14. In the preferred embodiment, the optical coupler 14 splits the optical signal in a 1:100 fanout. If more than 100 separate optical clock signals are required, additional laser diodes 12 and optical couplers 14 can be added. A system with multiple laser diodes 12 and optical couplers 14 is illustrated in FIG. 3. Oscillator 10 is connected through a common drive bus 40 to a plurality of laser diodes 12. Fanout is only limited by the ability of the oscillator 10 to drive bus 40.

In an alternate embodiment, oscillator 10 and laser diode 12 can be replaced with a laser diode pumped YAG laser. YAG lasers produce an abundance of laser power at a frequency determined by the optical cavity length. This approach however limits the system to operating at a single frequency rather than the range of frequencies possible with the oscillator 10 and laser diode 12 combination of FIGS. 1 and 3.

Figure 4:
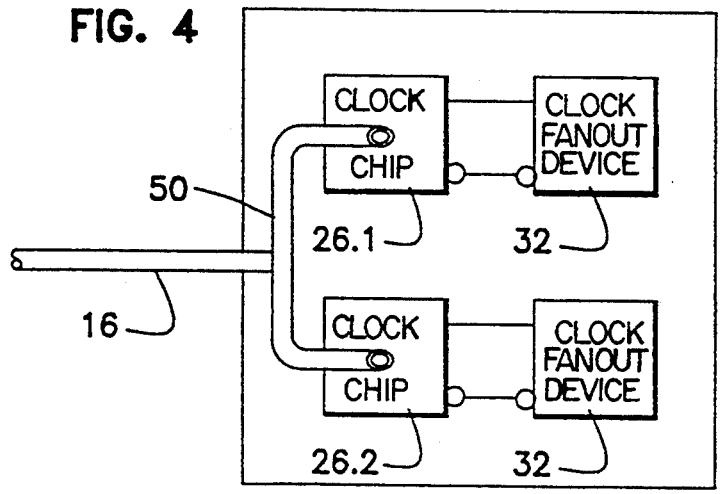
FIG. 4 illustrates a first alternative distribution method for the optical clock signal.

Other methods can be used to distribute the optical clock signal. FIG. 4 illustrates a first alternative distribution method wherein an optical fiber 16 connects to an optical wave guide 50 embedded in substrate 24. Optical wave guide 50 performs a 1:2 split of the optical signal which is then transmitted to clock chips 26.1 and 26.2, converted to equivalent electrical signals and sent to clock fanout devices 32.

Figure 5:
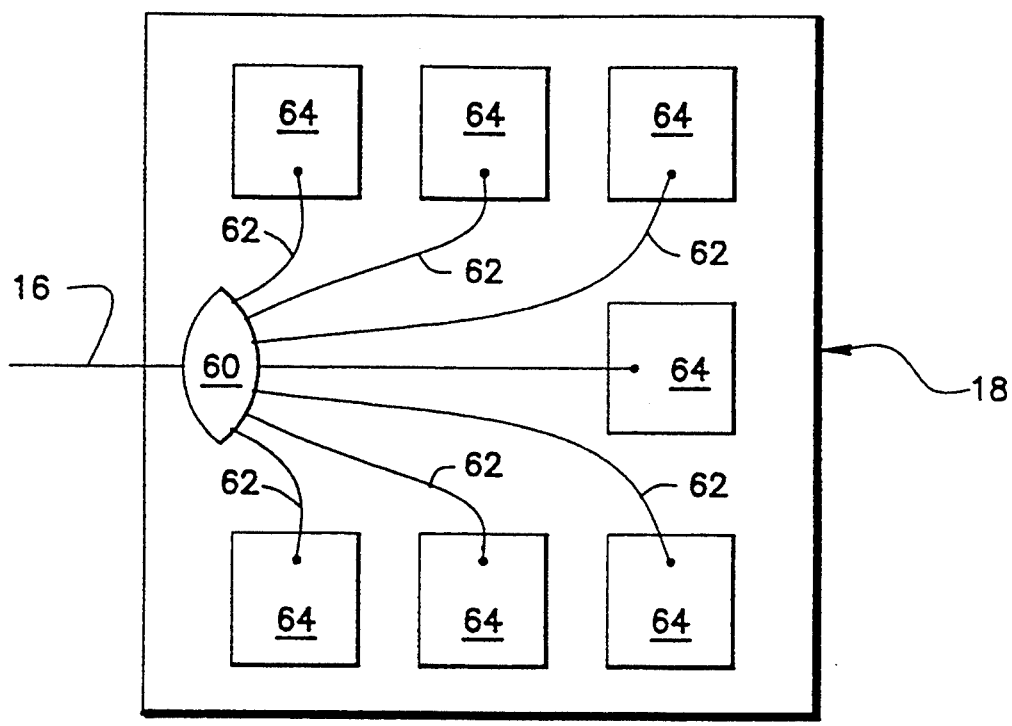
FIG. 5 illustrates a second alternative distribution method for the optical clock signal.

FIG. 5 illustrates a second alternative distribution method wherein optical fiber 16 is connected to an optical coupler 60 on each logic assembly 18. Optical coupler 60 is connected through waveguides 62 to integrated circuits 64. In this embodiment, the photodetector and transimpedance amplifier of clock chip 26 is integrated into each integrated circuit device 64.

An optical clock distribution method and apparatus has been disclosed wherein clock signals are transmitted to logic assemblies using optical fibers. The logic assemblies convert the optical clock signals into the equivalent electrical signals. The preferred embodiment is capable of an adjustable clock rate between 500 MHz and 1 GHz, with a skew less than or equal to 30 picoseconds as measured at the output of clock chip 26.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical clock distribution system for controlling skew between clocks distributed to a plurality of logic assemblies in a data processing system, comprising:
   laser generating means for generating coherent light modulated at a system clock frequency;
   first distribution means, connected to said laser generating means, for dividing said modulated light into a plurality of optical clock signals of approximately the same optical power;
   second distribution means, connected to said first distribution means and including a plurality of second equalized distribution paths, each connected for receiving and transmitting one of said plurality of optical clock signals; and
   third distribution means, connected to said second distribution means and including a plurality of third equalized distribution paths, each connected for receiving one of the optical clock signals from said second distribution means and each for generating a plurality of electrical clock signals representative of the received optical clock signal;
   wherein any one of said second equalized distribution paths may be connected to any one of said third equalized distribution paths resulting in the same clock path delay between said laser generating means and said third distribution means.

2. The optical clock distribution system of claim 1 wherein the third distribution means includes optical translation means connected to said first distribution means for converting an optical clock signal to an intermediate electrical clock signal and clock fanout means connected to said optical translation means for buffering said intermediate electrical signal to produce a plurality of electrical clock signals representative of the received optical clock signal.

3. The optical clock distribution system of claim 2 wherein the third distribution means further includes coupler means for distributing said optical signal to a plurality of said optical translation means.

4. The optical clock distribution system of claim 3 wherein the coupler means is an optical waveguide.

5. The optical clock distribution system of claim 1 wherein the first distribution means includes an optical coupler having at least one optical fiber connected to the input of the coupler and to said laser generating means so as to receive the modulated light signal, and wherein the second distribution means includes a plurality of optical fibers connected to the output of the coupler and to said third distribution means for transporting a portion of the modulated light thereto.

6. The optical clock distribution system of claim 1 wherein the laser generating means includes a YAG laser with optical cavity length such as to produce coherent light at the system clock frequency.

7. The optical clock distribution system of claim 1 wherein the laser generating means includes an oscillator connected to a laser diode for modulating the coherent light produced by said laser diode at the system clock frequency.

8. The optical clock distribution system of claim 1 wherein the laser generating means includes a plurality of laser diodes and at least one oscillator connected to the laser diodes for modulating the coherent light produced by each of the laser diodes at the system clock frequency, and wherein the first distribution means includes a plurality of optical couplers each connected to a different one of the laser diodes for accepting light generated by each diode and distributing it to said third distribution means.

9. A method of controlling clock skew in an optical clock distribution system in which an optical clock signal is distributed through an optical coupler and optical fiber to a plurality of optical-to-electrical translation devices, comprising:

(a) generating the optical clock signal;

(b) providing an optical coupler including an integrated input optical fiber pigtail for receiving the optical clock signal, the optical coupler further including a plurality of integrated output optical fiber pigtails for distributing the optical clock signal;

(c) providing a plurality of optical-to-electrical translation devices, wherein each device includes an integrated input optical fiber pigtail and an electrical output;

(d) cutting each integrated output optical fiber pigtail of the coupler so that the times required to propagate the optical clock signal through said coupler to the output of each of said output optical fiber pigtails of the coupler are equivalent;

(e) cutting the input optical fiber pigtail of each translation device so that the times required to propagate the optical clock signal from each of said input optical fiber pigtails to the output of its corresponding translation device are equivalent; and (f) connecting the input optical fiber pigtail of each translation device to an output optical fiber pigtail of said optical coupler.

* * * * *